(12) United States Patent
Kutlu

(10) Patent No.: US 11,540,523 B2
(45) Date of Patent: Jan. 3, 2023

(54) PRESERVING BAKLAVA BY MINCING INTO TRUFFLE

(71) Applicant: Christine Kutlu, Pearl River, NY (US)

(72) Inventor: Christine Kutlu, Pearl River, NY (US)

( * ) Notice: Subject to any disclaimer, the term of this patent is extended or adjusted under 35 U.S.C. 154(b) by 449 days.

(21) Appl. No.: 16/741,816

(22) Filed: Jan. 14, 2020

(65) Prior Publication Data

US 2021/0212327 A1  Jul. 15, 2021

(51) Int. Cl.
| | | |
|---|---|---|
| *A21D 15/08* | (2006.01) | |
| *A21D 13/24* | (2017.01) | |
| *A21D 13/28* | (2017.01) | |
| *A21D 13/17* | (2017.01) | |
| *A23G 3/50* | (2006.01) | |
| *A23G 3/36* | (2006.01) | |
| *A23G 3/34* | (2006.01) | |
| *A23P 10/22* | (2016.01) | |
| *A21D 13/40* | (2017.01) | |

(52) U.S. Cl.
CPC ............. *A21D 15/08* (2013.01); *A21D 13/17* (2017.01); *A21D 13/24* (2017.01); *A21D 13/28* (2017.01); *A21D 13/40* (2017.01); *A23G 3/001* (2013.01); *A23G 3/36* (2013.01); *A23G 3/50* (2013.01); *A23P 10/22* (2016.08); *A23G 3/343* (2013.01)

(58) Field of Classification Search
None
See application file for complete search history.

(56) References Cited

FOREIGN PATENT DOCUMENTS

JP        2004057143 A   *  2/2004

OTHER PUBLICATIONS

Machine translation of JP 2004/057143, date published Feb. 26, 2004, pp. 1-21. (Year: 2004).*
Flora&Vino "Cacao Dusted Dark Chocolate Truffles". Available online as of Dec. 2, 2018 from www.floraandvino.com. pp. 1-13. (Year: 2018).*
Brantley, "Cacao, Cocoa, chocolate: what are the difference and do they matter?". Available online as of Dec. 1, 2017 from www.tennessean.com. pp. 1-3. (Year: 2017).*
YouTube Video: Professional Baker teaches you how to make chocolate truffles!. Available online as of Oct. 11, 2017 from Oh Yum with Anna Olson, on Youtube.com. pp. 1-5. (Year: 2017).*
YouTube Video: Watch a pastry chef make the perfect batch of traditional Burma baklava. Available online as of Jun. 26, 2017 from Howitsmade, on Youtube.com. pp. 1-5. (Year: 2017).*
Robicelli, "Baklava Truffles". Available online as of Mar. 17, 2018 from www.foodnetwork.com. pp. 1-3. (Year: 2018).*
Annie's Chamorro Kitchen, "Baklava Truffles". Available online as of May 18, 2014 from https://www.annieschamorrowkitchen.com. pp. 1-8. (Year: 2014).*

* cited by examiner

*Primary Examiner* — Jenna A Watts
(74) *Attorney, Agent, or Firm* — Michael J. Feigin, Esq.; Feigin and Fridman LLC

(57) ABSTRACT

Baklava, a well-known and popular confection, typically requires preservatives to have a long shelf life. The present technology preserves the baklava naturally by homogenizing the baklava, partially or fully, until it is malleable with the hand. The malleable version thereof made into a regular shape such as a sphere and then covered with an edible sealant such as melting chocolate such that the moisture is substantially maintained in the baklava over a period of, at least, weeks.

19 Claims, 4 Drawing Sheets

PRESERVING BAKLAVA BY MINCING INTO TRUFFLE

FIELD OF THE DISCLOSED TECHNOLOGY

The disclosed technology relates generally to food preservation, and more specifically, to natural food preservation, and even more specifically, to natural food preservation of baklava.

BACKGROUND OF THE DISCLOSED TECHNOLOGY

Baklava is typically prepared with layers of filo dough (defined herein as "a very thin (no more than 1 cm) unleavened dough" where "dough" is defined herein as "an elastic malleable paste with flour or a flour substitute which is created for the purpose of baking into an edible food product"). Each layer of filo dough is separated with a fat, such as oil or butter. A layer of nuts or fillings, butter or oil and or spices are included between some or all of the layers, the nuts being walnuts, pistachios, hazelnuts, or the like. The ingredients described in this paragraph are then baked and a syrup such as honey or simple syrup is poured there-over. What is described in this paragraph is collectively defined as "Baklava" for the purposes of this disclosure.

Like many traditional foods, and even non-traditional foods, baklava is best served fresh. While some versions can last for multiple weeks especially if stabilizers and/or refrigeration is used, the freshness leaves the baklava in the form of moisture loss or the like. One who is an expert in the field of baklava as well as an ordinary occasional taster of baklava will readily appreciate (or unappreciate) that baklava is no longer "fresh" after three or four days. For purposes of this disclosure, "fresh" is defined as "not yet noticeably changed by time according to the ordinary observer", "not yet substantially changed by time", and/or "retaining at least 95% of the water content as when originally created."

While the problem of keeping foods fresh has partially been "solved" by the use of preservatives and refrigeration, moisture loss is still prevalent and freshness decreases. Still further, this "solution" changes traditional baklava into something with chemicals and undesired additional compositions. Thus, there is a need to retain the freshness of newly made baklava (for purposes of this disclosure, "new baklava" is defined as "made within three days") without the use of preservatives, other than sugar, or refrigeration.

SUMMARY OF THE DISCLOSED TECHNOLOGY

Baklava (which is defined in the "Background" section along with various other definitions) is preserved in embodiments of the disclosed technology by blending (mincing or other cutting to create particulate matter) baklava; whether it is fresh or at the end of its shelf life. Such baklava is made without preservatives other than sugar, and without prior refrigeration, in some embodiments. The blending can be with a manual or electric device, such as a food processor, which separates parts of filo dough, nuts or fillings, butter or oil and or spices and any combination thereof which is used in the baklava until the particles are substantially homogenized. Blending breaks the particles down into a size which is large enough to adhere to each other but small enough as to be reshaped into a desired shape with one's hand, tools or utensils. To get the right consistency, which is having the ingredients form into a shape without falling apart, one may need to blend the ingredients a bit more, perhaps add a little more syrup if the baklava is too dry, or leave as is.

The blending produces blended baklava which retains the chemical properties of the original baklava (which is fresh baklava in embodiments of the disclosed technology). One then compresses (pushes the particles together causing the particles to adhere to each other while reducing air between the particles and/or within the blended baklava and/or increases the density of the baklava) into a distinct shape such as a sphere, regular polygon, or substantially a sphere or regular polygon, similar to mixing ground beef and making meat balls or blending cake mixture to make cake pops. A rectangular prism is also contemplated as a distinct shape. A "distinct shape" is one which has a name known to an ordinary observer which can be used by another ordinary observer to describe three dimensional contours of the shape.

The substantially distinct shape is then surrounded by an edible sealant which is a substance which is ingestible and digestible by a human without ordinarily causing sickness to an otherwise healthy human being and which provides a measure of nutrition or digestion aid. A sealant is a device which prevents the escape, such as chocolate, or substantially prevents the escape, of moisture from an object which is coated therewith. The blended and sealant covered baklava can then be stored in its distinct shape (e.g. sphere) for a period of three weeks, four weeks, four months, six months, or one year substantially without losing moisture if kept in proper storage. It can be refrigerated, frozen, or left out on the counter covered.

The compressing can be carried out while rolling the blended version of the baklava into a ball (sphere) or pressing it into any shape. Compressing can cause adherence of particles of the blended version of the baklava together while retaining less air and moisture than the baklava had before the blending.

The baklava can be created, before carrying out the method described above, with a combination of filo dough, nuts or fillings, butter or oil and or spices, which were heated to a temperature of 325 degrees Fahrenheit until the dough is a crispy golden brown, or at least 170 degrees Fahrenheit, such as for 15, 20, 30, or 40 minutes.

The edible sealant is a majority melting baking chocolate in some embodiments. The chocolate is a food preparation of the form of a paste or solid at room temperature produced from cacao seeds. Sugar or another sweetener may be added to the chocolate before the chocolate is used as a sealant. Other items can be added to an exterior side and/or coat the exterior side of the edible sealant such as decorative chocolate, sprinkles, cacao powder or nuts/legumes etc. The edible sealant prevents ambient air (air surrounding or capable of touching the blended baklava by way of air currents which move air around in a room or on the earth in general) from contacting the blended baklava in some embodiments. Blending can be defined as particularizing and homogenizing the baklava.

Storing can be for at least three weeks and while retaining the distinct shape of the blended baklava with the edible sealant retaining substantially all moisture therein over the time of storage. The distinct shape of the blended baklava with the edible sealant is in the form of a truffle in some embodiments (a pliable or malleable, with force of two figures, confection). The truffle can have cacao in the edible sealant or as a covering exterior to the edible sealant which adheres thereto.

The baklava can be new baklava (already cooked and cooled) or baklava reaching the end of its shelf life which is defined as "within three days of expected time when the baklava is no longer saleable".

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED TECHNOLOGY

Baklava is naturally preserved without the need for additional preservatives, but for those used in producing the baklava itself and/or an edible covering with naturally occurring/grown ingredients. This is accomplished in a manner described herein-below concurrently with a discussion of the figures.

Figure 1:
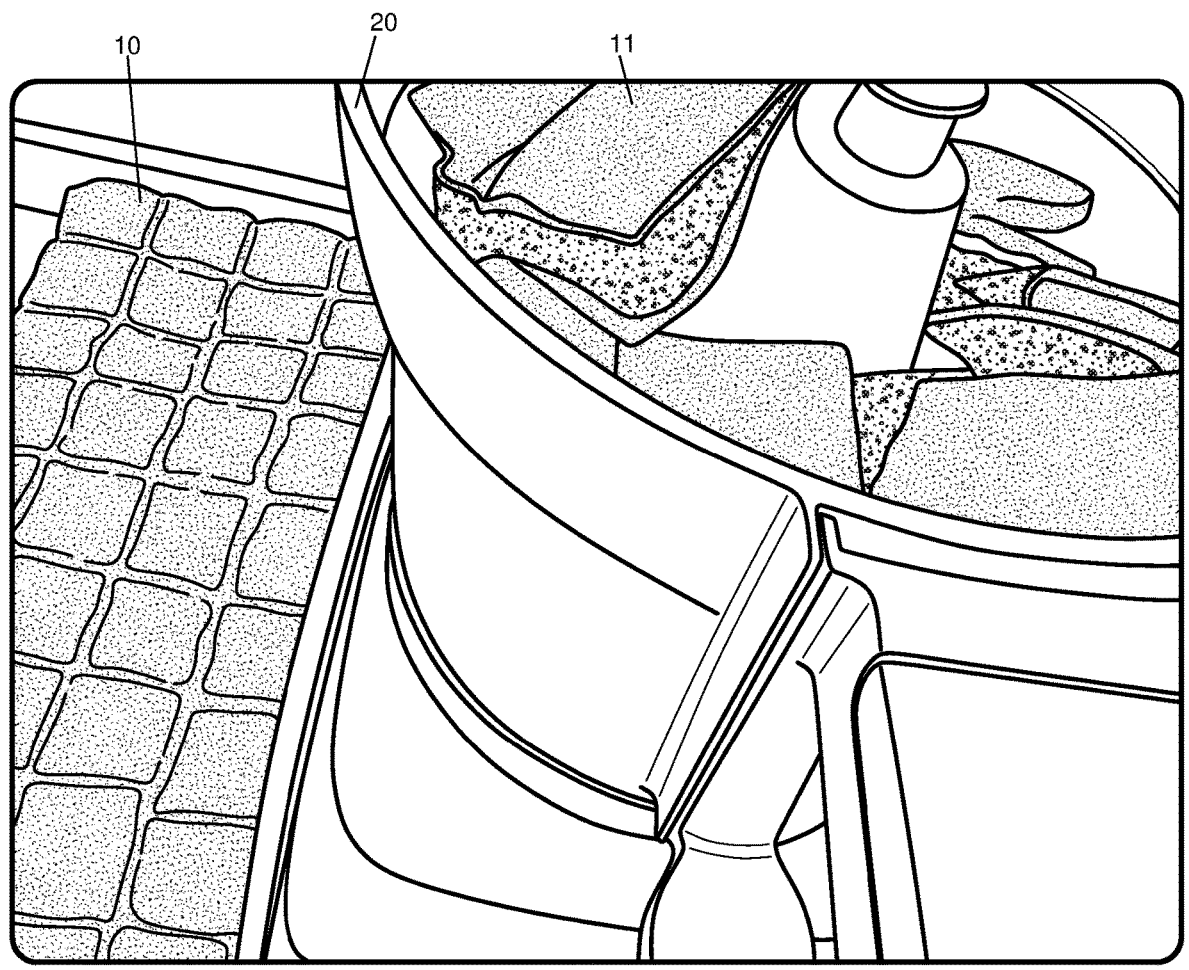
FIG. 1 shows completed/fresh baklava being blended in an embodiment of the disclosed technology.

FIG. 1 shows completed/fresh baklava being blended in an embodiment of the disclosed technology.

Here, the baklava 10 is blended (mincing or other cutting to create particulate matter) from a fresh and completed version thereof (cooked and cooled) which, in embodiments, is made with or without out preservatives, and without prior refrigeration. The blending can be with a manual or electric device, such as a blender or food processor 20 which separates parts of filo dough, nuts or fillings, butter or oil and or spices and any combination thereof which is used in the baklava until the particles are somewhat or are more substantially homogenized into a mixture 11. Blending breaks the particles down into a size which is large enough to adhere to each other but small enough as to be reshaped into a desired shape, without including a particle of another one of the ingredients, and placed back into the blend. The blending produces blended baklava which retains the chemical properties of the original baklava (which is fresh baklava in embodiments of the disclosed technology).

Figure 2:
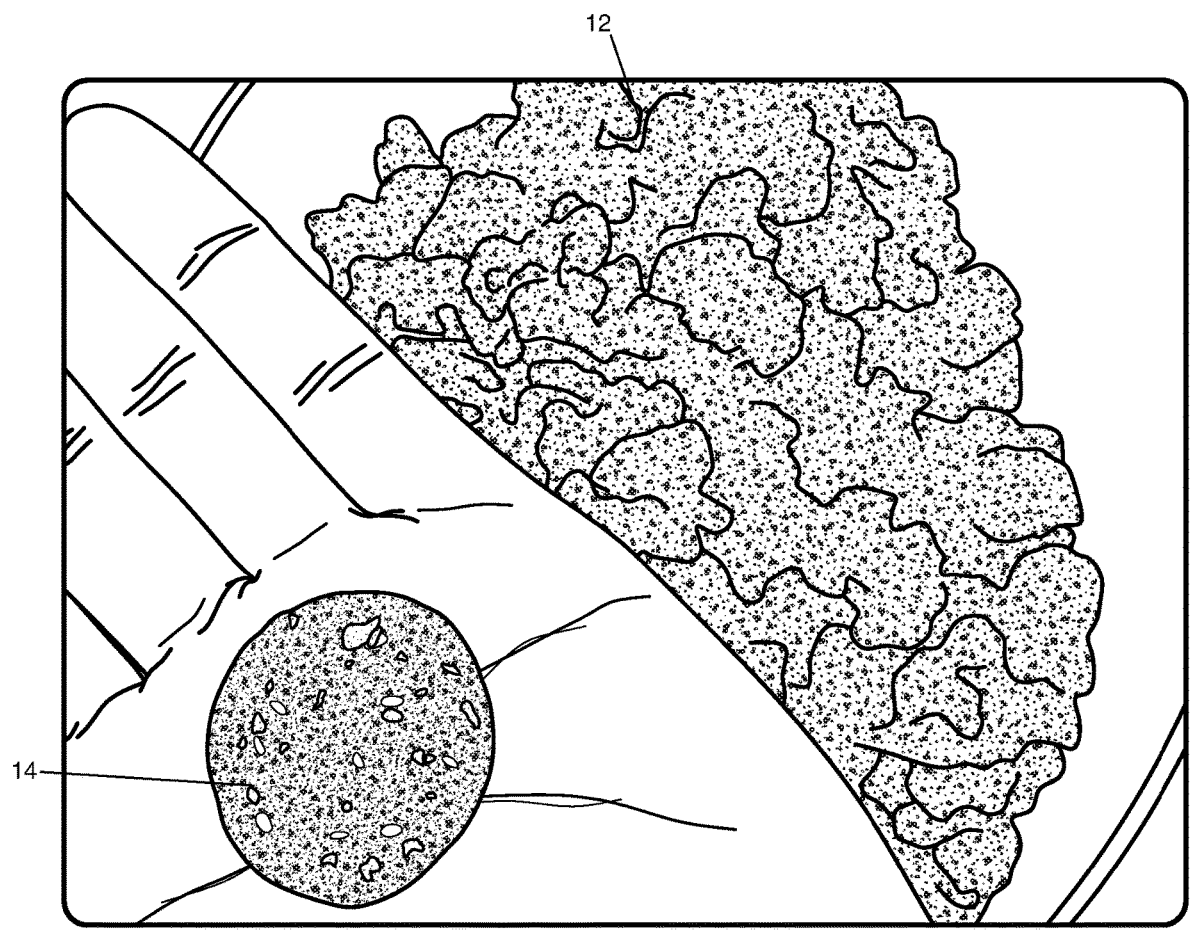
FIG. 2 shows a distinct shape (a ball/sphere) being formed from the blended baklava into a truffle in an embodiment of the disclosed technology.
Figure 3:
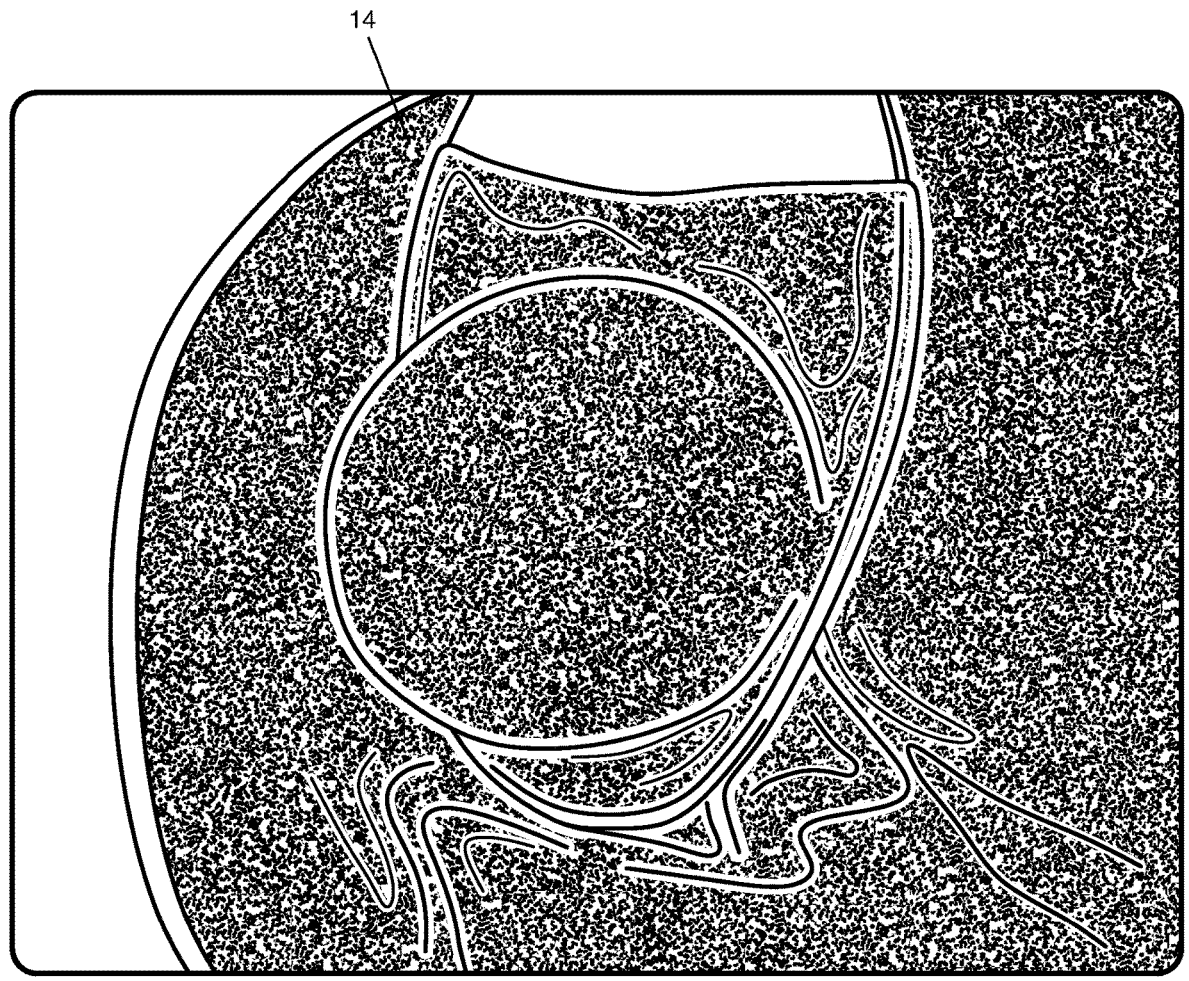
FIG. 3 shows a cutaway and magnified view of the distinct shape of FIG. 2 in embodiment of the disclosed technology such as shaped truffle covered in chocolate.

FIG. 2 shows a distinct shape (a ball/sphere) being formed from the blended baklava into a truffle in an embodiment of the disclosed technology. FIG. 3 shows a cutaway and magnified view of the distinct shape of FIG. 2 in embodiment of the disclosed technology. One compresses the baklava into a distinct shape 14, such as a sphere, regular polygon, or substantially a sphere or regular polygon. A rectangular prism is also contemplated as a distinct shape. A "distinct shape" is one which has a name known to an ordinary observer which can be used by another ordinary observer to describe three dimensional contours of the shape. The "compressing" is defined as pushing the particles together causing the particles to adhere to each other while reducing air between the particles and/or within the blended baklava and/or increases the density of the baklava).

Figure 4A:
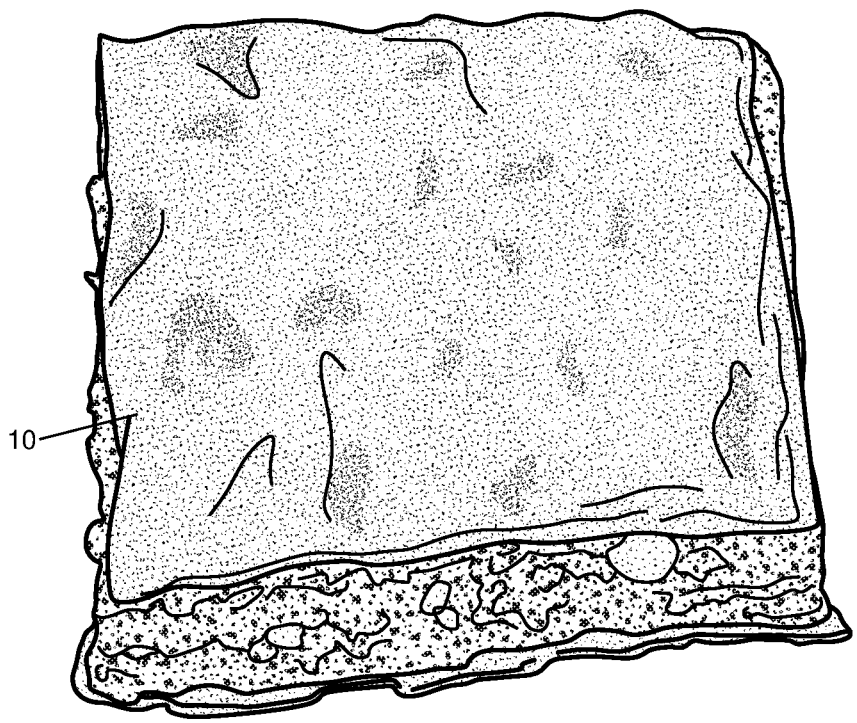
FIG. 4A shows a completed/fresh baklava used in embodiments of the disclosed technology, which is used to blend in a food processor.
Figure 4B:
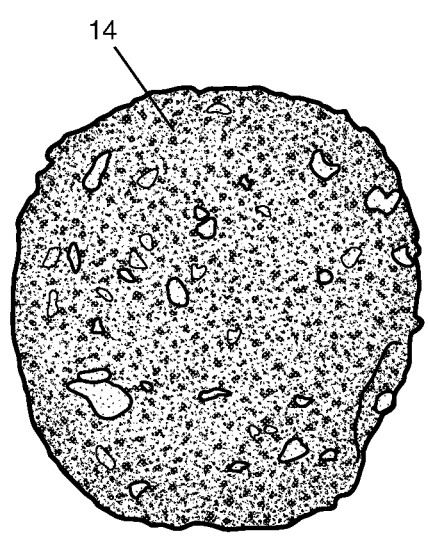
FIG. 4B shows a truffle formed in embodiments of the disclosed technology, before it is covered in chocolate.
Figure 4C:
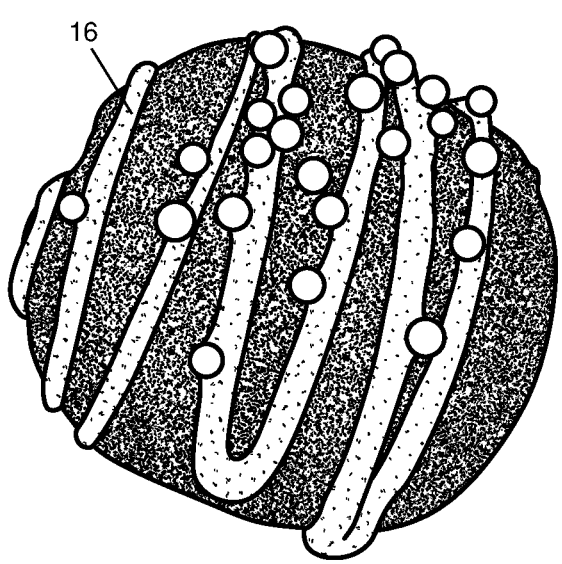
FIG. 4C shows the truffle after being coated with sealing and edible matter, such as chocolate, in embodiments of the disclosed technology.

FIG. 4A shows a completed/fresh baklava used in embodiments of the disclosed technology. FIG. 4B shows a truffle formed in embodiments of the disclosed technology. FIG. 4C shows the truffle after being coated with sealing and edible matter in embodiments of the disclosed technology. The truffle can be finalized by only blending the baklava inspired ingredients, but lasts much longer with the use of chocolate. The substantially distinct shape 14 created as shown in FIG. 2 is then surrounded by an edible sealant 16 which is a substance which is ingestible and digestible by a human without ordinarily causing sickness to an otherwise healthy human being and which provides a supply of materials that organisms and cells require to live. A sealant is a device which prevents the escape, or substantially prevents the escape, of moisture from an object which is coated therewith. The blended and sealant covered baklava can then be stored in its distinct shape (e.g. sphere) for a period of three weeks, four weeks, four months, six months, or one year substantially without losing moisture, and stored properly by keeping it covered, refrigerated, or frozen.

The compressing can be carried out while rolling the blended version of the baklava into a ball (sphere). Compressing can cause adherence of particles of the blended version of the baklava together while retaining less air and moisture than the baklava had before the blending.

The baklava can be created, before carrying out the method described above, with a combination of filo dough, nuts or fillings, butter or oil and or spices which were heated to a temperature of at least 170 degrees Fahrenheit, such as for 15, 20, 30, or 40 minutes.

The edible sealant 16 is chocolate in some embodiments. The chocolate is a food preparation made into a paste or solid at room temperature, and, in embodiments of the disclosed technology, produced from cacao seeds. Sugar or another sweetener may be added to the chocolate before the chocolate is used as a sealant. Other items can be added to an exterior side and/or coat the exterior side of the edible sealant such as cacao powder, sprinkles/decorations, or nuts/legumes. The edible sealant prevents ambient air (air surrounding or capable of touching the blended baklava by way of air currents which move air around in a room or on the earth in general) from contacting the blended baklava in some embodiments.

Storing can be for at least three weeks and while retaining the distinct shape of the blended baklava with the edible sealant retaining substantially all moisture therein over the time of storage. The distinct shape of the blended baklava with the edible sealant is in the form of a truffle in some embodiments (a pliable or malleable, with force of two figures, confection). The truffle can have cacao in the edible sealant or as a covering exterior to the edible sealant which adheres thereto.

The baklava can be new baklava (already cooked and cooled) which retains at least 95% of moisture of thereof in the blended baklava after three weeks.

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A method of preserving baklava, comprising the steps of:
   blending previously baked baklava with syrup into a blended version of said previously baked baklava;
   compressing said blended version of said baklava into a substantially distinct shape;
   surrounding said substantially distinct shape blended baklava with an edible sealant;
   storing said substantially distinct shape blended baklava with said edible sealant.

2. The method of claim 1, wherein said substantially distinct shape is formed after breaking down particles of said previously baked baklava into a size which is large enough to adhere to each other and small enough as to be reshaped into a substantially spherical shape.

3. The method of claim 2, wherein said compressing involves rolling said blended version of said baklava into said substantially spherical shape after said breaking down of said previously baked baklava.

4. The method of claim 1, wherein said compressing causes adherence of particles of said blended version of said baklava together while retaining less air and moisture than said baklava before said blending.

5. The method of claim 1, wherein said baklava comprises at least filo dough, nuts or fillings, butter or oil which were heated to a temperature of at least 170 degrees Fahrenheit before said step of blending.

6. The method of claim 1, wherein said edible sealant is at least 51% chocolate and chocolate is defined as a food preparation in the form of a paste or solid at room temperature produced from cacao seeds or other melting chocolate ingredients.

7. The method of claim 6, wherein said edible sealant prevents ambient air from contacting said blended baklava.

8. The method of claim 1, wherein said edible sealant is a food product fit for human consumption that prevents the passage of air to said blended version of said baklava surrounded by said edible sealant.

9. The method of claim 1, wherein said blending is defined as particularizing and homogenizing said baklava.

10. The method of claim 1, wherein said storing is for a period of at least three weeks and said distinct shape said blended baklava with said edible sealant retains substantially all moisture therein over said at least three weeks.

11. The method of claim 10, wherein said distinct shape is defined as a shape which is recognizable by a person having ordinary skill in the art and which is retained over said period of at least three weeks.

12. The method of claim 11, wherein said distinct shape is a substantially regular polygon.

13. The method of claim 1, wherein said distinct shape said blended baklava with said edible sealant is in the form of a truffle.

14. The method of claim 13, wherein said truffle is malleable.

15. The method of claim 14, wherein said truffle comprises cacao in said edible sealant.

16. The method of claim 14, wherein said truffle comprises cacao in a covering adhered to said edible sealant.

17. The method of claim 1, wherein said baklava is new baklava and retains at least 95% of moisture of said baklava in said blended baklava after three weeks.

18. A method of preserving baklava, comprising the steps of:
   blending already cooked and cooled baklava into particulate matter;
   compressing said particulate matter into a substantially distinct shape;
   surrounding said substantially distinct shape with an edible sealant;
   storing said substantially distinct shape with said edible sealant; wherein said cooked and cooled baklava comprises filo dough, a filling, spices, and one of butter or oil, which is formed into a baked product before said step of blending.

19. The method of claim 18, wherein said baklava is within three days of an expected time when the baklava is no longer saleable.

* * * * *